(12) United States Patent
Svarovsky et al.

(10) Patent No.: US 9,286,329 B2
(45) Date of Patent: Mar. 15, 2016

(54) GENERATING ANALYTICS APPLICATION USING REUSABLE APPLICATION MODULES

(71) Applicant: GoodData Corporation, San Francisco, CA (US)

(72) Inventors: Tomas Svarovsky, Daly City, CA (US); Petr Olmer, San Francisco, CA (US)

(73) Assignee: GoodData Corporation, San Francisco, CA (US)

( * ) Notice: Subject to any disclaimer, the term of this patent is extended or adjusted under 35 U.S.C. 154(b) by 0 days.

(21) Appl. No.: 14/169,483

(22) Filed: Jan. 31, 2014

(65) Prior Publication Data

US 2015/0220572 A1 Aug. 6, 2015

(51) Int. Cl.
*G06F 17/00* (2006.01)
*G06F 7/00* (2006.01)
*G06F 17/30* (2006.01)

(52) U.S. Cl.
CPC .................. *G06F 17/30294* (2013.01)

(58) Field of Classification Search
CPC ................................ G06F 17/30294
USPC ....................................... 707/603
See application file for complete search history.

(56) References Cited

U.S. PATENT DOCUMENTS

| | | | | |
|---|---|---|---|---|
| 4,864,497 | A * | 9/1989 | Lowry | G06F 17/30958 707/E17.011 |
| 5,930,764 | A | 7/1999 | Melchione et al. | |
| 5,978,790 | A * | 11/1999 | Buneman | G06F 17/30294 707/999.002 |
| 6,356,913 | B1 * | 3/2002 | Chu | G06F 17/30294 707/999.002 |
| 6,553,563 | B2 * | 4/2003 | Ambrose et al. | 717/116 |
| 6,662,202 | B1 * | 12/2003 | Krusche et al. | 718/101 |
| 6,831,668 | B2 * | 12/2004 | Cras et al. | 715/853 |
| 7,003,560 | B1 * | 2/2006 | Mullen et al. | 709/223 |
| 7,076,782 | B2 * | 7/2006 | Smith | 718/104 |
| 7,149,734 | B2 * | 12/2006 | Carlson et al. | 707/999.006 |
| 7,783,672 | B2 * | 8/2010 | Whalen | H04L 41/0893 707/694 |
| 7,797,289 | B2 * | 9/2010 | Chan | G06Q 10/10 706/47 |
| 7,809,698 | B1 * | 10/2010 | Salz | G06F 21/6227 707/694 |
| 7,895,563 | B2 * | 2/2011 | Carlson et al. | 717/102 |

(Continued)

FOREIGN PATENT DOCUMENTS

WO    WO 2008/106783 A1    9/2008

OTHER PUBLICATIONS

PCT International Search Report and Opinion, PCT Application No. PCT/US2014/66092, Feb. 6, 2015, eight pages.

*Primary Examiner* — Pavan Mamillapalli
(74) *Attorney, Agent, or Firm* — Fenwick & West LLP

(57) ABSTRACT

Analytics applications are generated using application modules. An application module stores metadata for use in an analytics application. The application module is associated with one or more data fields that correspond to data used in the analytics reports of an application module. An application module may be a composite application module that includes other application modules. An analytics application is generated from a specification including a set of fields. The set of data fields of the specification are matched against the data fields of the application modules. An application module matches the specification of the analytics application if the specification includes all the data fields of the application module. All matching application modules are selected and sent for deployment of the analytics application. The analytics application generated is configured to present information based on analytics reports.

20 Claims, 10 Drawing Sheets

(56) References Cited

U.S. PATENT DOCUMENTS

| | | | |
|---|---|---|---|
| 8,370,359 B2* | 2/2013 | Byrne | G06F 17/30294 707/737 |
| 2002/0029376 A1* | 3/2002 | Ambrose et al. | 717/113 |
| 2002/0059195 A1* | 5/2002 | Cras et al. | 707/3 |
| 2003/0046282 A1* | 3/2003 | Carlson et al. | 707/6 |
| 2003/0182470 A1* | 9/2003 | Carlson et al. | 709/328 |
| 2005/0010566 A1 | 1/2005 | Cushing et al. | |
| 2006/0069585 A1 | 3/2006 | Springfield et al. | |
| 2006/0206890 A1* | 9/2006 | Shenfield et al. | 717/174 |
| 2006/0212543 A1* | 9/2006 | O'Farrell et al. | 709/219 |
| 2006/0259392 A1* | 11/2006 | Rabenold et al. | 705/37 |
| 2007/0033567 A1* | 2/2007 | Carlson et al. | 717/100 |
| 2007/0130517 A1* | 6/2007 | Wu | 715/530 |
| 2007/0157287 A1 | 7/2007 | Lim | |
| 2007/0260625 A1* | 11/2007 | Tien et al. | 707/101 |
| 2007/0265863 A1* | 11/2007 | Tien et al. | 705/1 |
| 2009/0210855 A1* | 8/2009 | Ramanathan | 717/102 |
| 2012/0089564 A1 | 4/2012 | Bakalash et al. | |
| 2012/0284312 A1 | 11/2012 | Gore et al. | |
| 2013/0073340 A1 | 3/2013 | Alex et al. | |
| 2013/0325504 A1* | 12/2013 | Greene et al. | 705/3 |
| 2014/0081903 A1 | 3/2014 | Koosel et al. | |
| 2014/0289391 A1 | 9/2014 | Balaji et al. | |
| 2015/0026165 A1 | 1/2015 | Louie et al. | |

* cited by examiner

GENERATING ANALYTICS APPLICATION USING REUSABLE APPLICATION MODULES

FIELD OF INVENTION

This invention relates generally to generation of analytics applications and more specifically to generation of analytics applications using reusable application modules.

BACKGROUND

Analytics applications are used by businesses to analyze their business data and make business decisions based on the data. These applications typically process business data, generate analytics reports, and display results of the analytics reports. Conventional approaches for developing analytics application include building the application from scratch and using templates that can be customized for specific applications. Building applications from scratch typically requires expertise in development of applications and may require significant development time and cost. The approach based on customization of templates also requires knowledge of templates and expertise in customization of templates and may require significant development time and cost.

Some vendors provide prebuilt applications that do not require significant customization for a specific business. However, these applications are tied to a specific source of data as well as a specific structure of data. These applications do not function when used with other sources of data or data that is structurally different from those for which the applications are designed. Accordingly, conventional systems for building analytics applications either require expensive solutions or are inflexible.

SUMMARY

Embodiments allow generation of analytics applications using application modules. An analytics application generator stores a set of application modules. An application module stores metadata for use in an analytics application. For example, the metadata may describe an analytics report and information for displaying the results of the analytics report. An application module describes one or more data fields used in the analytics reports. The analytics application generator receives a specification for generating an analytics application. The specification describes a set of data fields for use in the analytics application. The analytics application generator matches the set of data fields from the specification with data fields of the application modules. An application module matches the specification if the specification includes all the data fields of the application module. The analytics application generator selects one or more application modules based on the matching. The analytics application generator sends the selected application modules for deployment of the analytics application.

The features and advantages described in this summary and the following detailed description are not exhaustive. Many additional features and advantages will be apparent to one of ordinary skill in the art in view of the drawings, specification, and claims hereof.

Figure 1:
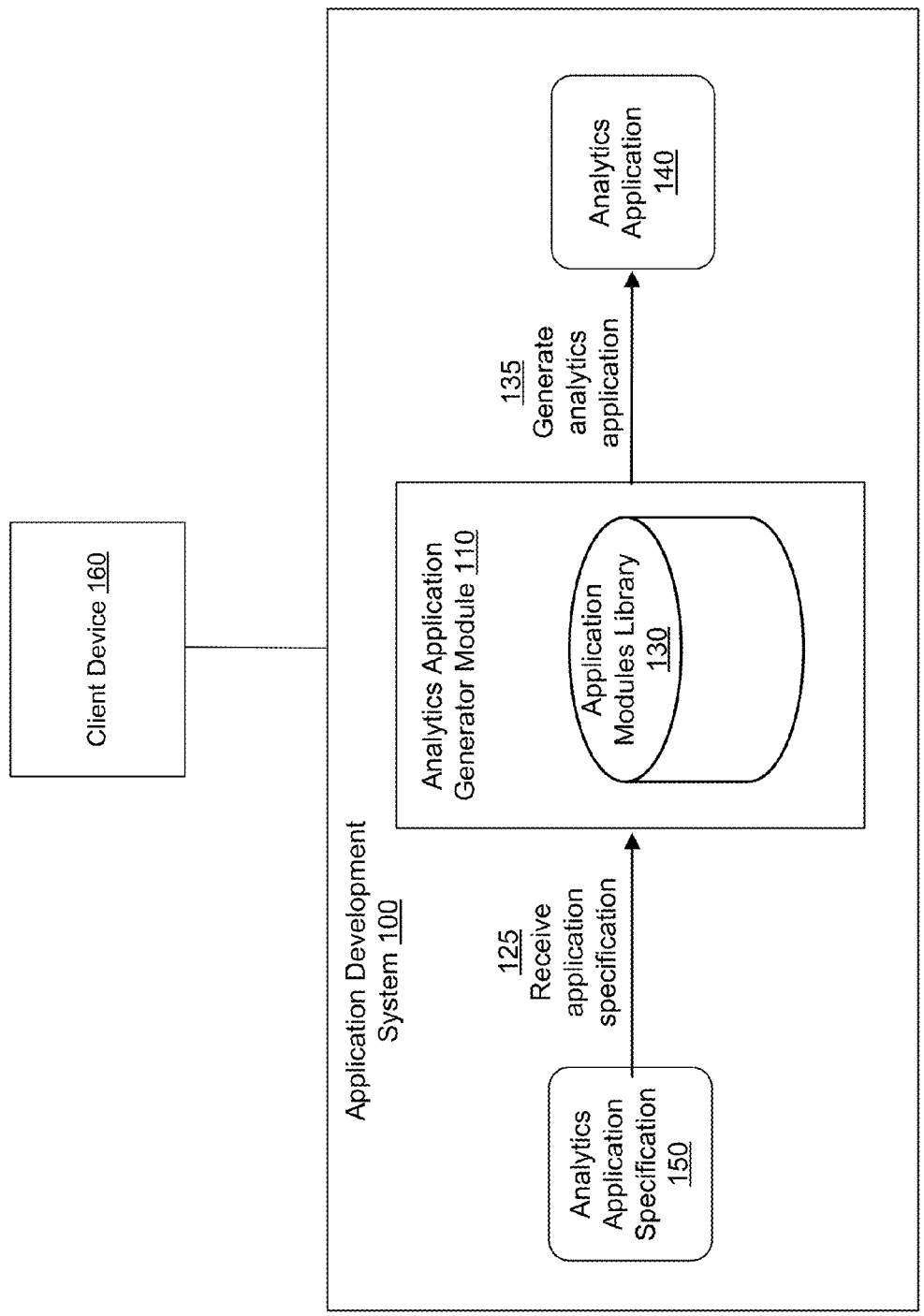
FIG. 1 illustrates overall system environment for generation of analytics applications, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Analytics Applications for Business Intelligence

Business intelligence comprises methodologies, processes, architectures, and technology used to identify and analyze business data. Examples of business data include data of commercial or business value to an organization, project, department, or product; such as data corresponding to profits, sales, gross margin, revenues, customer retention rates, customer lifetime values, customer renewal rates, customer engagement rates, customer satisfaction scores, and the like. Business data may be categorized or segmented based on organizations, departments, projects, products, and so on. In other words, different organizations, departments, projects, and products may have different underlying business data and therefore employ different methods to analyze the underlying business data to produce different results.

Analysis of business data allows an analyst to distil key patterns or statistical trends from the underlying raw data (e.g., trends and patterns not directly obvious from the raw data). The processed output facilitates a viewing user to make speedy and meaningful conclusions from the business data. The processed output may be presented or displayed in the form of a visual user interface (e.g., a report, a dashboard, a collection of charts, and so on) that summarizes key patterns or statistical trends underlying the raw data.

Since the amount of data to be processed can be significantly large and complex, business analytics is performed using analytics applications. An analytics application may perform various steps on business analytics including, extract transform and load (ETL) of data from an external source, loading the imported data into a database, generating reports based on the data, and visualizing the report data. Embodiments allow development of analytics applications using application modules that represent reusable components.

An application module performs the various steps of processing of business analytics for a subset of data, for example, for a set of fields including importing the data corresponding to the set of fields from and external source, defining a database schema for the set of fields and storing the imported data in a database based on the database schema, generating reports corresponding to the fields, and visualizing the data. Use of the application modules reduces the development time and effort for the analytics application significantly compared to developing the application from scratch even though the application is not tied to a particular input data schema or organization of data.

In an embodiment, the application module comprises metadata describing various operations that can be performed for a set of fields. The operations performed for the set of fields include ETL operations, operations for storing and retrieving data from a database, operations for generating a report based on one or more fields from the set of fields, and information describing visualization of the generated reports. An execution engine deploys the application modules by using the metadata to retrieve data for data fields of the application module from a corresponding external system, generates an analytics report described by an application module, and configures for display, information based on the analytics report. A data field is also referred to herein as a field, an application field, or an application data field.

FIG. 1 illustrates overall system environment for developing analytics applications, according to an embodiment. The application development system 100 allows an application developer to generate applications using application modules. The application developer uses the client device 160 for application development by connecting the client device 160 to the application development system 100, for example, using a network. The system environment may include other components not shown in FIG. 1, for example, external systems from which a generated analytics application may retrieve data processed by the analytics application.

Client device 160 can be a conventional computer system (e.g., a desktop or laptop computer), a tablet, or a device having computer functionality such as a personal digital assistant (PDA), a mobile telephone, a smartphone or another suitable device. The application development system 100 comprises an analytics application generator module 110. The analytics application generator module 110 comprises an application modules library 130. The application modules library 130 stores a set of predefined application modules.

An application developer provides analytics application specification 150 to application development system 100. Analytics application generator module 110 reads and processes analytics application specification 150. Analytics application generator module 110 determines which application modules of application modules library 130 are applicable to the analytics application being developed based on analytics application specification 150. The analytics application generator module 110 generates analytics application 140 based on the analytics application specification 150.

The analytics application generator module 110 may generate analytics application 140 partially if the application modules library 130 does not include application modules corresponding to all fields specified in analytics application specification 150. The application modules library 130 is extensible. For example, an application developer or a vendor may add new application modules to the library for fields that were previously not mapped to existing application modules. Alternatively, an application developer may customize an existing application module by adding reports to the application module, by modifying the way data is visualized in the module, or by adding/deleting data fields for the application module.

Figure 2:
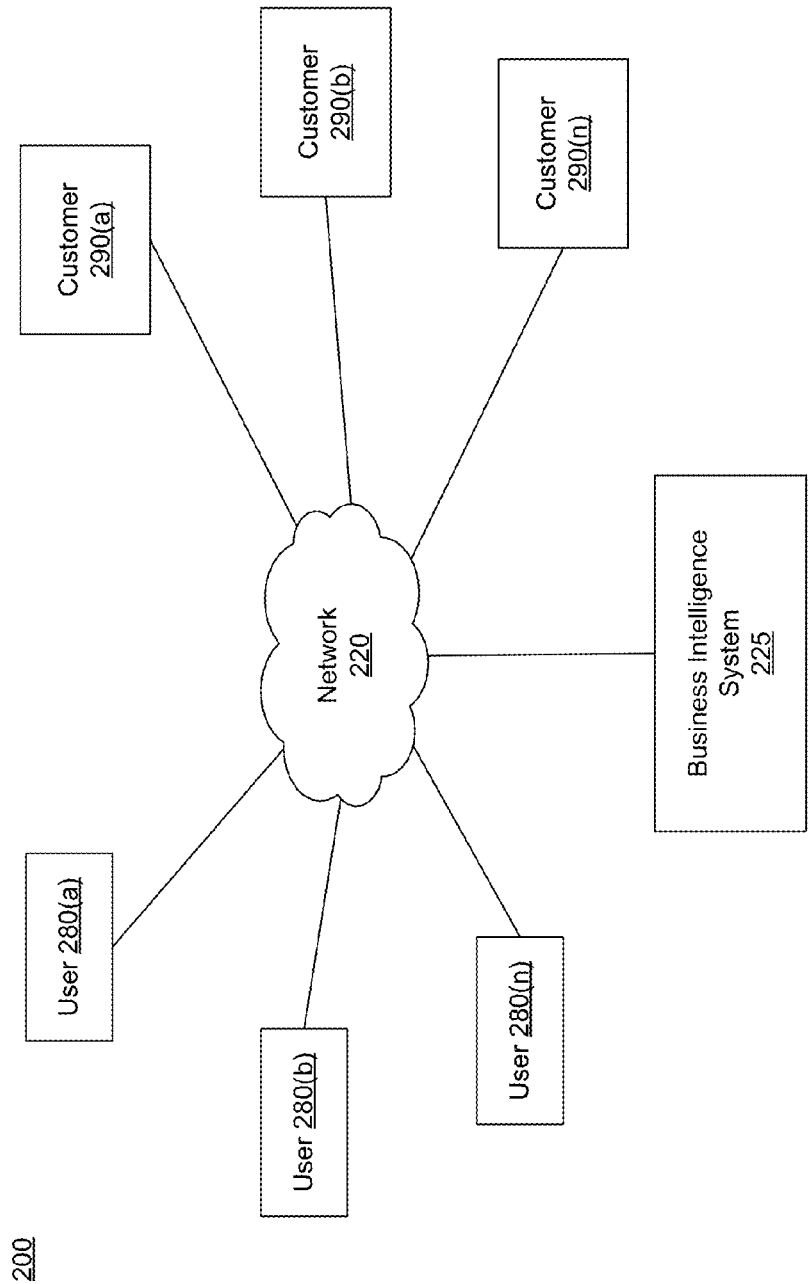
FIG. 2 illustrates a system environment for deploying the analytics applications, according to an embodiment.

FIG. 2 illustrates a system environment for deploying analytics applications, according to an embodiment. The business intelligence environment 200 comprises one or more users 280 (e.g., user 280(a), 280(b), and the like), a network 220, one or more customers 290 (e.g., customer 290(a), 290(b), and the like), and a business intelligence system 225. The system environment shown in FIG. 2 may include other components not shown in FIG. 2, for example, external systems from which a generated analytics application may retrieve data processed by the analytics application.

FIG. 2 and the other figures use like reference numerals to identify like elements. A letter after a reference numeral, such as "280a," indicates that the text refers specifically to the element having that particular reference numeral. A reference numeral in the text without a following letter, such as "280," refers to any or all of the elements in the figures bearing that reference numeral (e.g. "280" in the text refers to reference numerals "280a" and/or "280b" in the figures).

The users 280 include one or more computing devices capable of receiving user input as well as transmitting and/or receiving data via the network 220. In some embodiments, a user 280 corresponds to or includes a client device 160. In some embodiments, the client device is configured to communicate via the network 220 with the business intelligence system 225 and with one or more customers 290.

In some embodiments, in the business intelligence environment 200, a user 280 is associated with or authenticated by a customer 290. Business intelligence system 225 stores business data and customization metadata (e.g., customization parameters) for each of the customers 290. The business intelligence system 225 may receive a request from a user via network 220 to show business intelligence data associated with a customer. The business intelligence system 225 generates and provides a customized business intelligence interface for display to the user based on business intelligence data and customization metadata associated with the customer associated with the requesting user.

In some embodiments, a client device of user 280 executes an application allowing the user 280 of the client device to interact with the business intelligence system 225 and with one or more customers 290. For example, a client device at user 280 executes a browser application to enable interaction between the client device and the business intelligence system 225 via the network 220. In another embodiment, a user 280 interacts with the business intelligence system 225 through an application programming interface (API) running on a native operating system, such as IOS® or ANDROID™, of the client device.

The users 280 are configured to communicate via the network 220, which may comprise any combination of local area and/or wide area networks, using both wired and/or wireless communication systems. In one embodiment, the network 220 uses standard communications technologies and/or protocols. Data exchanged over the network 220 may be represented using any suitable format, such as hypertext markup language (HTML) or extensible markup language (XML). In some embodiments, all or some of the communication links of the network 220 may be encrypted using any suitable technique or techniques.

Additionally, one or more customers 290 are coupled to the network 220 for communicating with the business intelligence system 225. In some embodiments, as described further with reference to FIG. 2, customers 290 include source databases for storing business intelligence data at the customer location. Additionally, customers 290 store parameters for configuring analytics and display of the business intelligence data by one or more users 280. Furthermore, in some embodiments, customers 290 store and provide identification information used to authenticate one or more of the users 280 that have access rights to the business intelligence analytics, associated with the customers 290. Details of custom-branded analytic applications in a multi-tenant environment are described in U.S. patent application Ser. No. 14/051,469, filed on Oct. 11, 2013, which is hereby incorporated by reference in its entirety.

Figure 3:
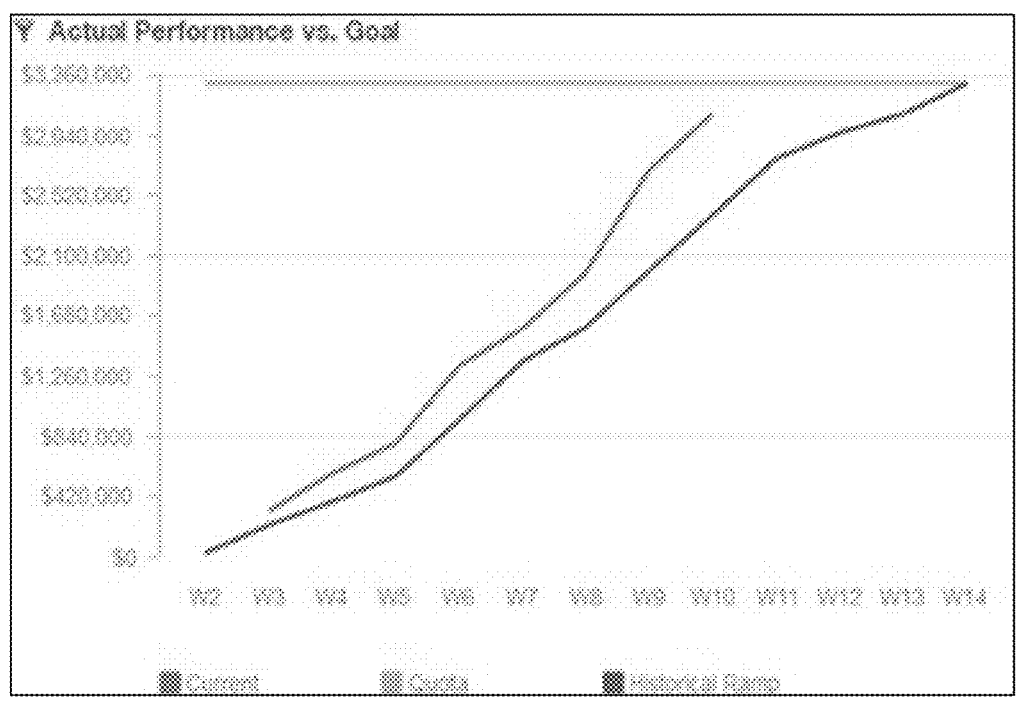
FIG. 3 illustrates examples of the user interface of an analytics application, in accordance with some embodiments.

FIG. 3 illustrates examples of the user interface of an analytics application, in accordance with some embodiments. In an embodiment, metadata of an application module includes information that defines the format of the presentation of data for a user interface associated with the application module. For example, the metadata may specify how results of an analytics report defined by the metadata is presented in a user interface. FIG. 3 shows an analytics application that includes a graphical user interface that displays a user's past or historical performance over a predefined duration of time, and enables comparison of the user's performance against the user's or a customer's predefined goals. In these embodiments, the business intelligence system stores and accesses data corresponding to the user's past performance over varying granularities of time scale.

The set of data analytics parameters optionally include parameters that specify methods to track and monitor the user's performance and parameters that specify the user's or customer's predefined goals to compare the user's performance against. This approach of visually tracking business performance compared against a predefined goal helps customers, and users affiliated with the customers, anticipate and manage risk by making business decisions in a timely manner so as to stay on track to hit predefined goals by proactively analyzing and reviewing past performance.

Application Modules

Application modules comprise metadata describing characteristics of a part of an analytics application. In an embodiment, the application module may include metadata describing processing associated with a subset of data fields that may be processed by an application. The processing may include retrieving data for the data field from an external source, storing the data in a database, processing the data fields to generate an analytics report, and configuring the results of the analytics report for presentation.

An application module includes metadata that allows a system (e.g., the business intelligence system 225) to retrieve data for a set of source fields for storing in data fields of applications and process them to generate one or more reports that are displayed in a user interface. A data field of an application is also called application data field. Each data field may retrieve data from a source, for example, an external system such that the data field maps to a source field of the external system. A data field may correspond to more than one source fields. Alternatively, a single source field may correspond to multiple data fields of an application module.

The analytics application specification 150 may specify the transformations that map the source fields of the source of data to the data fields of the application. A transformation may map a single source field to a single data field of the application, multiple source fields to a single data field, or a single source field to multiple data fields of the application module. The transformation allows users to modify the data that is imported from a source of data. For example, a source of data may be represented in a format different from the format of the application module. The transformation converts the format of the data of the source to the format of the application module.

An analytics application may present a set of user interfaces showing information from a set of analytics report, each report processing one or more data fields. In an embodiment, an application module implements a subset of user interfaces of an analytics application that present data from a set of analytics report. Accordingly, the application module processes a subset of data fields of the analytics application. The metadata of an application module can be processed by a runtime engine to execute the analytics reports and render the user interfaces that present results from the analytics reports. In an embodiment, an application module comprises code or instructions for performing various operations for a subset of an analytics application.

Figure 4:
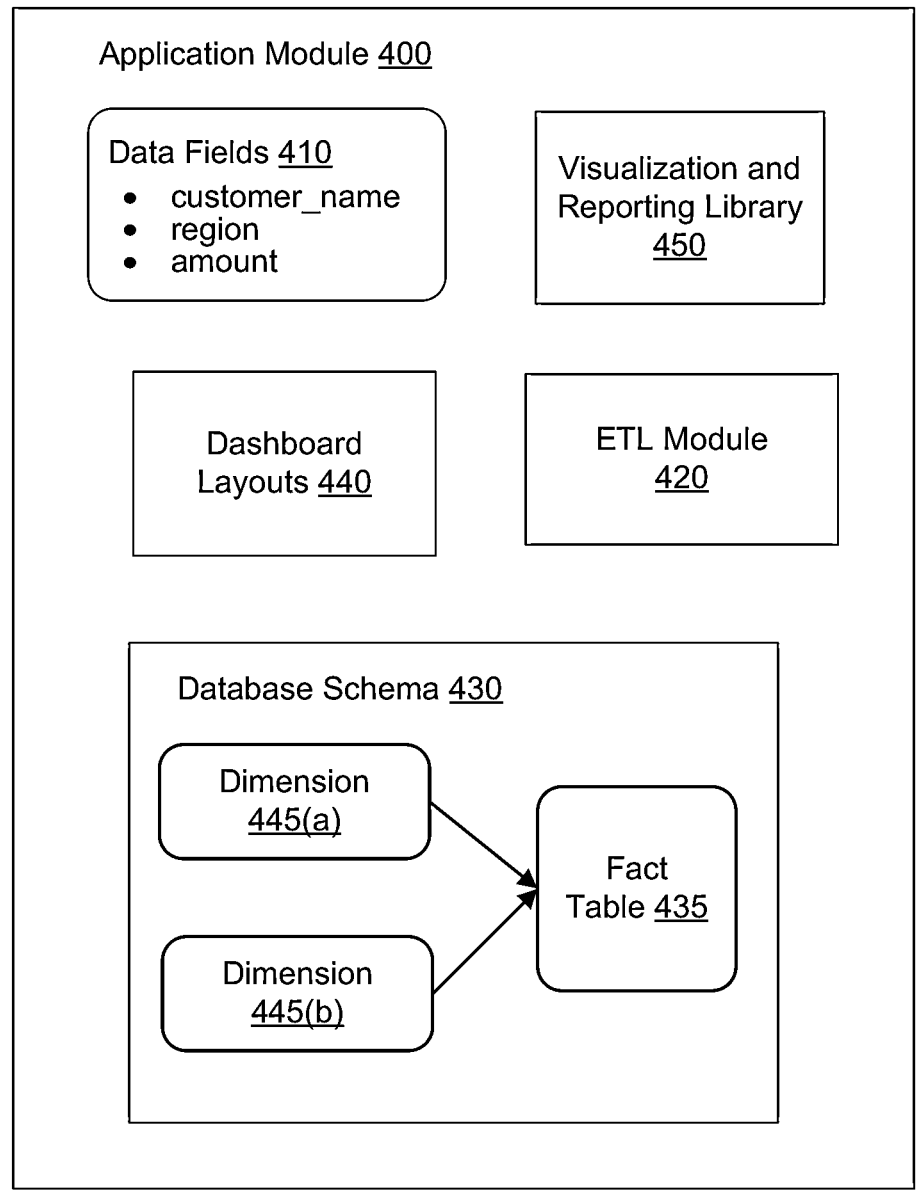
FIG. 4 illustrates an application module for analytics applications, in accordance with an embodiment.

FIG. 4 illustrates an application module for analytics applications, in accordance with an embodiment. The application module 400 comprises visualization and reporting library 450, dashboard layouts, ETL module 420, and database schema 430. The application module 400 may comprise other modules not shown in FIG. 4, for example, modules for performing transfer of data from an external system.

The application module 400 is associated with a set of data fields 410. A data field 410 may be a required data field or an optional data field. For example, the application module illustrated in FIG. 4 is associated with required data fields customer_name, region, and amount. An application module 400 can be used to generate 135 an analytics application 140 if the analytics application specification 150 comprises specification of all the required fields of the application module. In an embodiment, the specification of a data field 410 in an analytics application specification comprises an association between the data field and a field of a source of the data, for example, an external system. The specification of the data field in the analytics application specification may include information describing how data may be retrieved from the source of data. For example, if the source of data is an external system, the specification of the data field may include the URL (uniform resource locator) of the external system or another mechanism to identify the external system. The specification of the data field may also include credentials for accessing the data from the external system, for example, parameters for creating a session or a connection with the external system.

If the analytics application specification 150 provided to the application development system 100 is missing any of the required fields of the application module, the application module is not used for generation 135 of the analytics application. For example, if the specification of analytics application A1 is {customer-name, region, sales_item, amount} and the specification of analytics application A2 is {customer_name, region, time_of_sales, sales_representative}, the application module 400 shown in FIG. 4 can be used for analytics application A1 but not for analytics application A2.

The application module 400 may also be associated with a set of optional fields. If the analytics application specification 150 provided doesn't include all the optional fields, the analytics application generation module 110 can still generate 135 the analytics application. In an embodiment, the application generation module 110 uses default values for optional fields when the corresponding specification is missing. An optional field may not be used by the application module if the analytics application does not specify the optional field. Accordingly, one or more reports or user interface elements that use the field are not presented to the user in the generated analytics application. For example, the user interface corresponding to the application module may comprise multiple tabs, each tab presenting information based on a report. One or more tabs of the user interface may not be displayed in the generated analytics application if the optional field is not available in the specification of the analytics application.

The database schema 430 comprises the structure of the data as it is stored in a database by the application module 400. For example, the database schema 430 defines the tables used to store the fields associated with the application module. The database schema also defines the relations between the fields of the application module and other fields that may be associated with other modules. For example, relations between fields may be specified as foreign key and primary key constraints of database tables.

In an embodiment, the database schema 430 for a set of fields is a star schema comprising one or more fact tables 435 and a set of dimension tables 445. The fact table 435 stores business facts, for example, sales of various items of a business. The dimension tables store descriptive attributes associated with the business. For example, information describing various products of a business may be stored in a dimension table. The fact table 435 stores foreign keys to dimension tables. For example, a particular record in a fact table may correspond to sales of various products of a business. The record may store a foreign key into a dimension table describing products offered by the business. An analytics report, may join the fact table with the dimension table, for example, to describe sales of products of a business in a given time period.

The dashboard layout 440 specifies how reports of the application module 400 are presented in a user interface, for example, a dashboard of the business intelligence system 225. The dashboard layout 440 may specify the columns displayed in a user interface, the order in which the columns are presented, a type of chart used to display certain information, fonts used for text, colors used for various portions of the user interface, and so on. The visualization and reporting library 450 includes the code or instructions for presenting the reports for the application module 400. In an embodiment, the visualization and reporting library 450 sends required information to a client device so as to allow the client device to present information. For example, the client device may use an internet browser to display information and the visualization and reporting library 450 may configure a webpage and send the webpage to the internet browser for displaying.

In some embodiments, the user interface of an analytics application displays one or more of, a dashboard, a business report, a goal tracking interface, a performance tracking interface, one or more charts for data visualization. Examples of charts that may be displayed include pie charts, charts with multiple concurrently plotted parameters, bar graphs for visual comparison of multiple concurrently plotted parameters, correlation plots, bar graphs trending values of a given parameter over time, graphs trending a relationship between two or more parameters, geographical maps with data plotted over specific geographical regions, waterfall charts showing discrete changes over time, bullet charts showing performance against goals, and the like.

Figure 5:
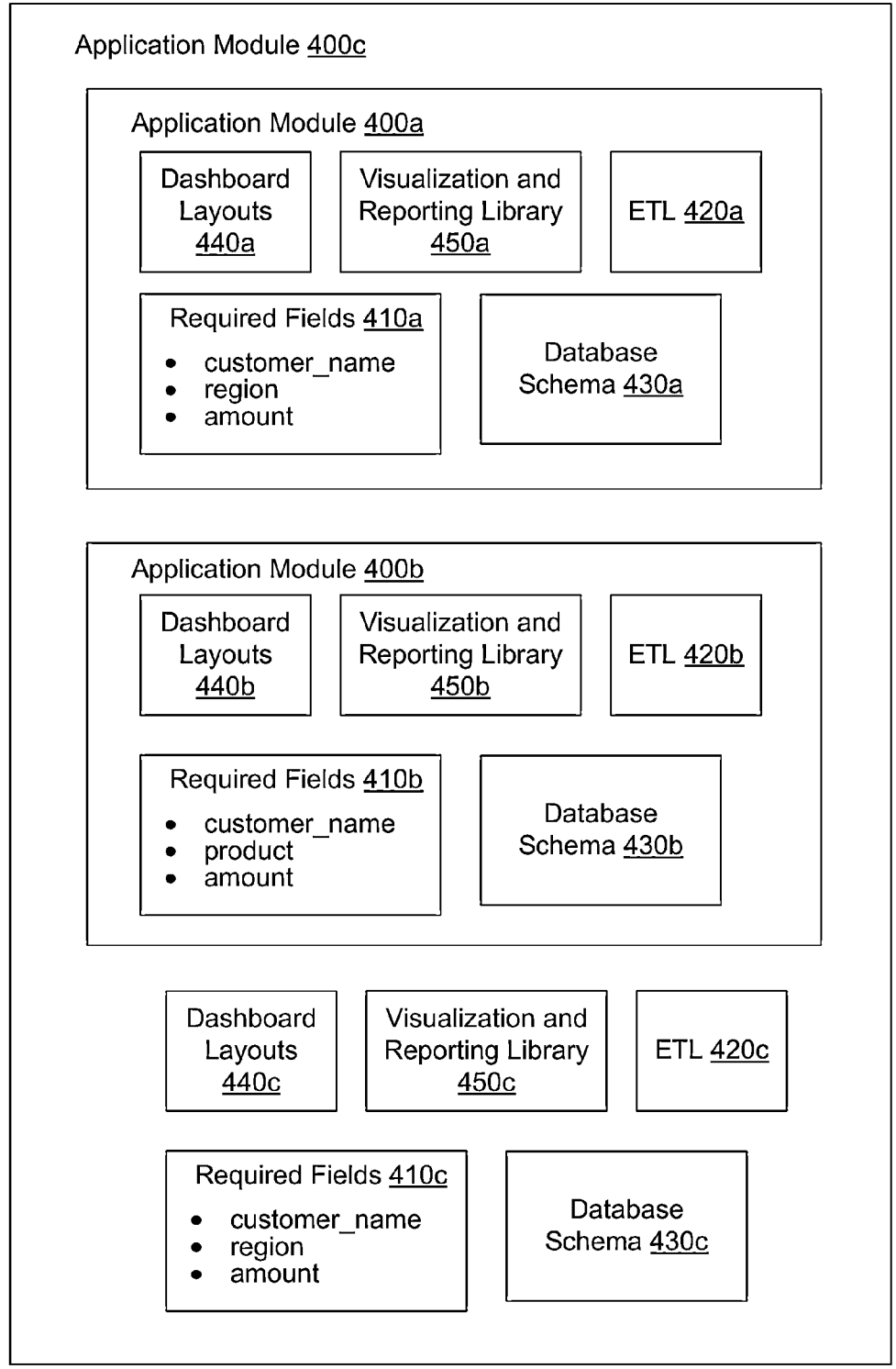
FIG. 5 illustrates a hierarchical structure of application modules, in accordance with an embodiment.

FIG. 5 illustrates a hierarchical structure of application modules, in accordance with an embodiment. The application modules may be hierarchically organized. For example, an application module may contain one or more application modules. An application module that contains other application modules is called a composite application module. As shown in FIG. 5, application module 400c is a composite module that includes application modules 400a and 400b. A composite application module can contain any number of application modules that can themselves be composite application modules. For example, application modules 400a and 400b themselves may be composite application modules. Application modules 400a, 400b include components dashboard layouts 440a, 440b, visualization and reporting libraries 450a, 450b, ETL modules 420a, 420b, and database schemas 430a, 430b respectively. A composite application module may or may not contain additional components of the application (metrics, visualizations and reports, or dashboards). For example, composite application module 400c includes components dashboard layout 440c, visualization and reporting libraries 450c, ETL modules 420c, and database schemas 430c.

Figure 6:
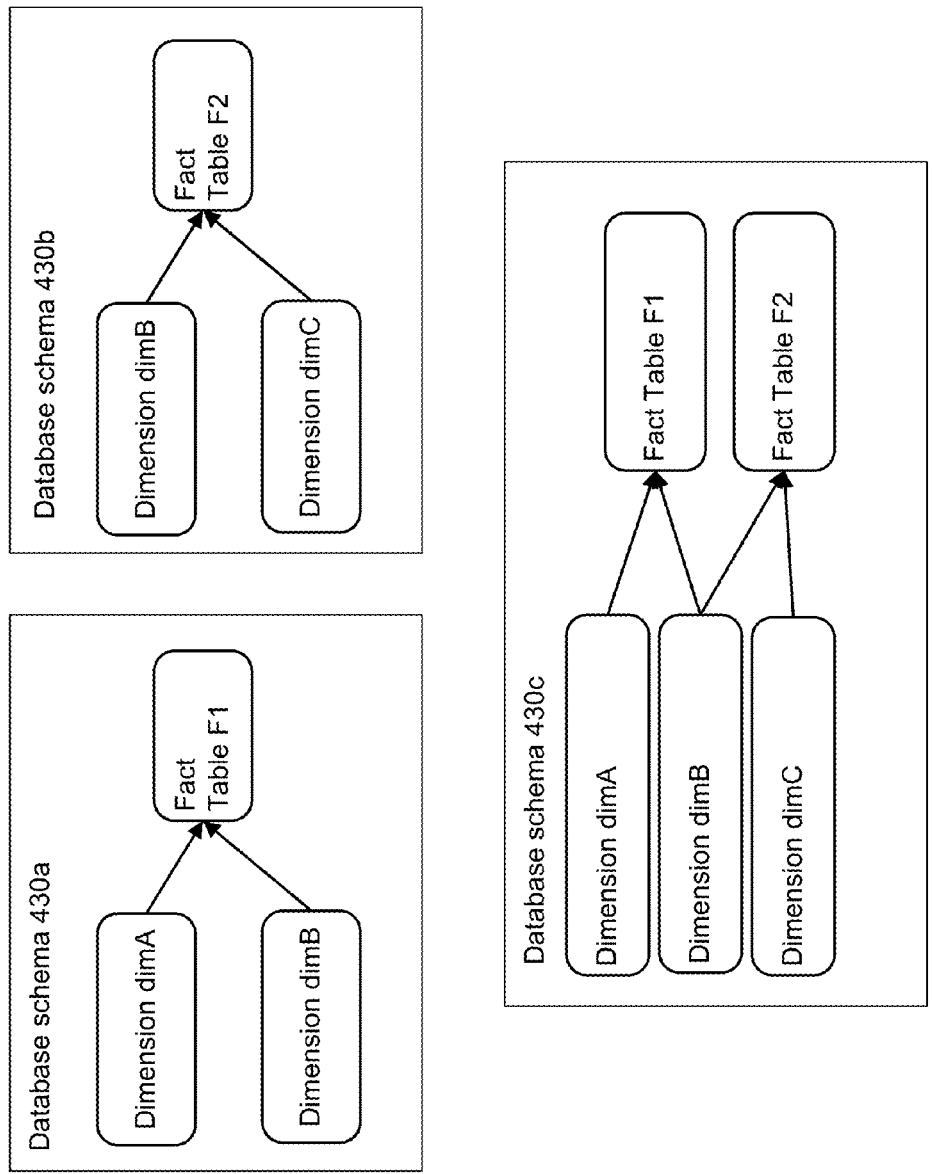
FIG. 6 shows how additional relationships between fields may be determined by combining database schemas multiple application modules, in accordance with an embodiment.

The database schemas for composite application module may make use of shared dimensions that allow the independent schemas of the contained application modules to be related to each other. This allows for reporting across relationships that do not exist in the contained application modules. FIG. 6 shows how additional relationships between fields may be determined by combining database schemas multiple application modules, in accordance with an embodiment. For example, a composite application module may generate reports relating two or more fields that are not related in any individual application module contained in the composite application module.

As shown in FIG. 6, the database schema 430a of application module 400a includes a fact table F1 and two dimension tables dimA and dimB. The database schema 430b of application module 400b includes a fact table F1 and two dimension tables dimB and dimC. However, the fields processed by individual application modules 400a and 400b are not related. However, the database schema 430c of composite application module 400c includes fact tables F1 and F2 and dimensions dimA, dimB, and dimC. Since dimB is common across the two application modules 400a and 400b, the composite application module 400c can define reports that related fields across the application modules 400a and 400b. For example, a report can be defined for composite application module 400c that relates dimA and dimC. As a result, a composite application module allows two previously separate database schemas to be logically connected across a shared dimension. This in turn allows for specifying additional metrics, reports, and dashboards that did not exist in the individual application modules.

System Architecture

Figure 7:
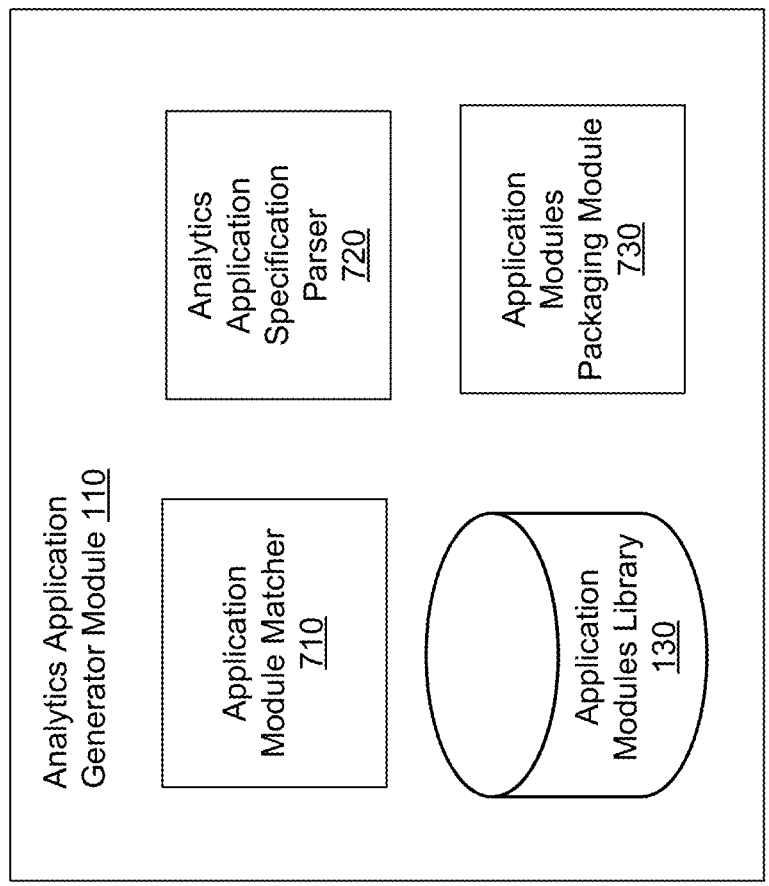
FIG. 7 illustrates the system architecture of the analytics application generator module of the application development system, according to an embodiment.

FIG. 7 illustrates the architecture of the analytics application generator module of the application development system, according to an embodiment. The analytics application generator module 110 includes an application module matcher 710, an analytics application specification parser 720, the application modules library 130, and an application modules packaging module 730. In other embodiments, the analytics application generator module 110 may include other components or modules. Furthermore, any functionality described herein may be implemented by a different module.

The analytics application specification parser 720 parses the specification of an analytics application provided by an application developer. The analytics application specification parser 720 generates a representation of the information provided corresponding to an analytics application. The analytics application specification specifies a set of data fields processed by the analytics application. The data fields correspond to data processed by the analytics application. For example, the analytics application may generate reports corresponding to the data fields and display them. The analytics application specification also specifies a source field corresponding to a data field of the application. The source field describes a data source for accessing the data for the data field, for example an external system. The analytics application specification provides information regarding how to access the external system, for example, an address of the external system and the protocol used to retrieve the information. The protocol used to retrieve the information may include the information to create a connection with the external system and the corresponding names of the fields in the external system. For example, a data field of the analytics application may be called customer_name and corresponding source field in the external system may be called cust_name.

The application module matcher 710 matches application modules against the analytics application specification 150. The application module matcher 710 matches the data fields required by an application module against fields specified in the analytics application specification 150. The application module matcher 710 determines that an application module matches the analytics application specification 150 if the analytics application specification 150 specifies all required data fields of the application module. In other words, the application module matcher 710 determines if the analytics application specification 150 specifies the details of the source field corresponding to each required data field of the application module. If any of the required fields of an application module is not described in the analytics application specification 150, the application module matcher 710 determines that the application module does not match the analytics application.

The application modules library 130 stores application modules that are available for application developers to use. The application modules may be provided by various vendors or by the application developers themselves. An application developer may customize an application module by specifying modifications to the application module. For example, an application developer may add some fields or remove existing fields, add new analytics reports, modify existing reports, modify presentation of an analytic report, and so on. The modified application module is stored in the application modules library 130. The application modules packaging module 730 combines a set of application modules selected for an analytics application and packages them for deployment. The package of the application modules is sent to the business intelligence system 225 for execution.

Figure 8:
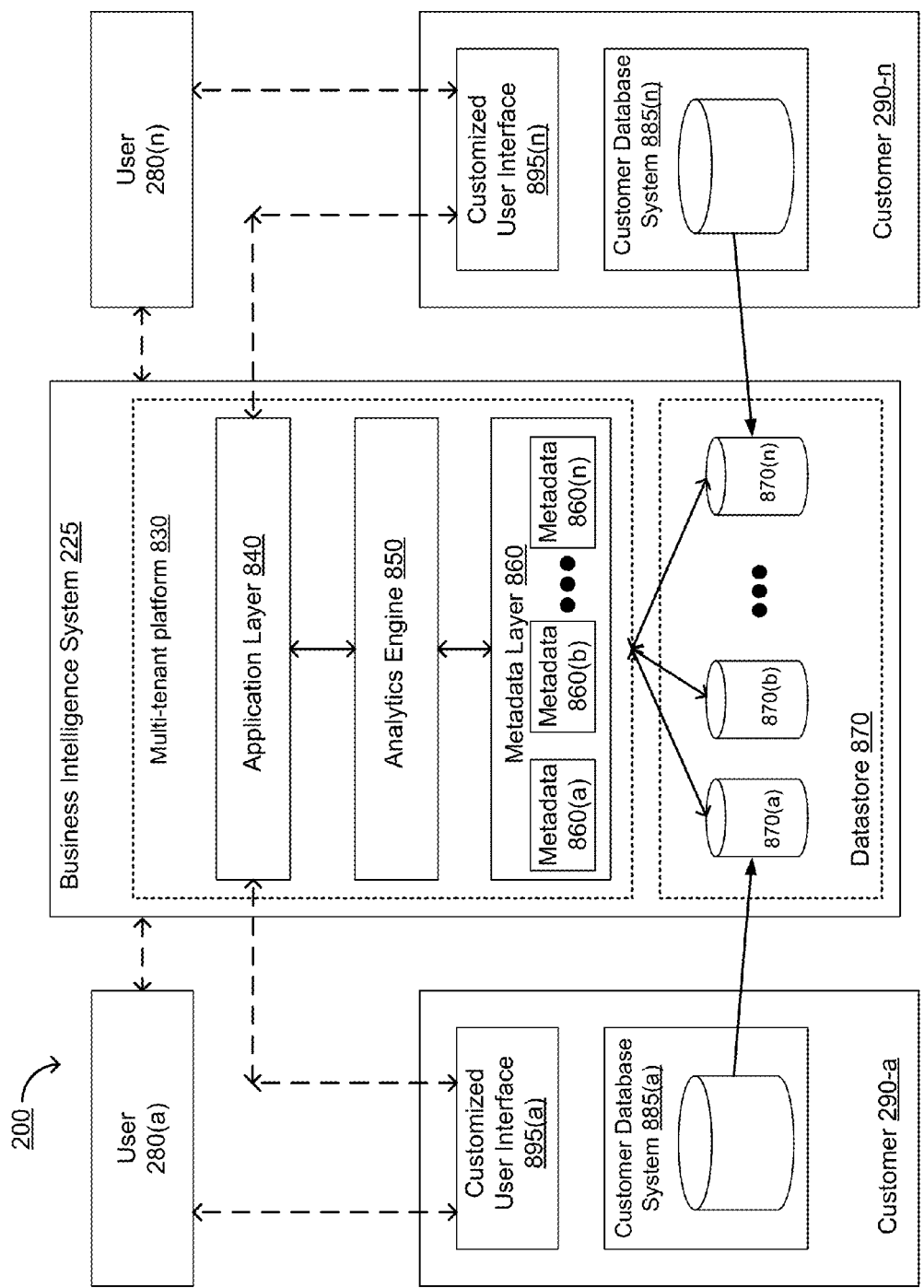
FIG. 8 illustrates the system architecture of the business intelligence system for deploying the analytics applications, according to an embodiment.

FIG. 8 illustrates an architecture of the business intelligence system for deploying the analytics applications, according to an embodiment. Business intelligence environment 200 shown in FIG. 8 includes business intelligence system 225, one or more customers 290, and one or more users 280. Business intelligence system 225 stores business data and customization metadata (e.g., customization parameters) for each of the customers 290, corresponding to the business intelligence needs of the customers 290. Upon receiving a request from a respective one of the users 280 associated with a respective one of the customers 290, business intelligence system 225 analyzes business data corresponding to the respective customer based on the customization metadata associated with the respective customer. Business intelligence system 225 then generates and provides a customized business intelligence interface for display to the respective user.

In some embodiments, business intelligence system 225 transmits the generated customized business intelligence interface for display directly to the respective user. In alternative embodiments, business intelligence system 225 transmits the generated customized business intelligence interface to the respective customer. The respective customer, in turn, optionally stores the customized business intelligence interface, for example, customized user interface 895(a) stored by customer 290(a) at the customer site. The respective customer then provides the customized business intelligence interface, for display, to the respective user. In such embodiments, the customized user interface at the respective customer is optionally updated based on the metadata stored at the business intelligence system 225 and associated with the respective customer.

Accordingly, in some embodiments, business intelligence system 225 includes datastore 870 and multi-tenant-platform 830. Datastore 870 optionally maintains a plurality of customer databases 870(a), 870(b), and the like. Each database of the plurality of customer databases in datastore 870 includes data representative of corresponding source data stored at a corresponding customer location. For example, customer database 870(a) in datastore 870 stores data representative of source data stored in customer database system 885(a) at customer 290(a). Similarly, customer database 870(n) in datastore 870 stores data representative of source data (e.g., business data stored at the customer location) stored in customer database system 885(n) at customer 290(n).

Although FIG. 8 shows that data representative of source customer data is stored in datastore 270, of the business intelligence system 225, at the plurality of customer databases 270(a), 270(b), and the like, the customer data or data representative of such customer data could be stored at and accessed from one or more systems remote from the business intelligence system (e.g., a customer location, a third party location, and so on).

In some embodiments, business intelligence system 225 retrieves representations of source data (e.g., optionally with modifications to the source data to facilitate efficient query-processing) from a customer location (e.g., from a customer server remote from the business intelligence system 225) corresponding to the particular customer to store in a particular customer database. In some embodiments, business intelligence system 225 periodically updates the particular database based on modifications to the source data stored at the customer location. In some embodiments, modifications to the source data are periodically pushed to datastore 870 from the customer location. In alternative embodiments, modifications to the source data are actively pulled from the customer location periodically into the datastore 870.

Multi-tenant platform 830 of business intelligence system 225 interfaces with and queries the plurality of customer databases in datastore 870. Multi-tenant-platform 830 includes a unified metadata layer 860 that stores metadata for each of the customers 290, for example, metadata 860(a) for customer 290(a), metadata 860(b) for customer 290(b), and the like. In some embodiments, metadata for each of the customers includes a set of customization parameters for the respective customer, for example, data display parameters and a data analytics parameters. The business intelligence system 225 acts as a single consolidated multi-tenant platform that stores customization parameters for each of the plurality of customers and is capable of querying each of the plurality of databases provides improved storage and performance efficiency over separate analytics platforms targeted to serve each individual customer.

In some embodiments, the set of customization parameters for a particular customer is custom-provided by the particular customer so as to control visual appearance and functionality of customized business analytics rendered for display to one or more users affiliated with the particular customer.

In some embodiments, unified metadata layer 860 additionally stores common or shared metadata (e.g., a common or shared set of data display parameters, and a common or shared set of data analytics parameters) that is common or shared between all of the customers 290 and is used by business intelligence system 225 to control visual appearance and functionality of customized business analytics rendered for display to users affiliated with all of the customers 290.

In some embodiments, multi-tenant platform 830 of business intelligence system 225 includes an analytics engine 850 that is configured to (e.g., responsive to a request from a particular user affiliated with a particular customer) analyze a dataset retrieved from a particular customer database corresponding to the particular customer based on the set of data analytics parameters for the particular customer. Toward this end, in some embodiments, analytics engine 850 accesses a set of customization parameters (e.g., metadata) for the particular customer, from the metadata layer 860, to obtain a set of data analytics parameters for the particular customer. Analytics engine 850 then formulates one or more customized database queries based on: the set of data analytics parameters for the determined customer and one or more properties (e.g., type of business intelligence data, physical data storage type or logical data storage type or logical schema) of the identified customer database and executes the one or more customized database queries on a customer database, to analyze the dataset.

In some embodiments, business data stored in a first customer database corresponding to a first customer (e.g., customer database 870(*a*) corresponding to customer 290(*a*)) is distinct in data type from business data stored in a second customer database corresponding to a second customer (e.g., customer database 870(*n*) corresponding to customer 290(*n*)). For example, the first customer database includes financial data records for an organization, including chronologically generated financial statements, quarterly earnings and the like; whereas the second customer database includes customer relation information for an organization, such as customer referrals, customer renewals, customer satisfaction data, and the like.

Additionally, in some embodiments, the physical or logical organization of business data stored in a first customer database (e.g., customer database 870(*a*) corresponding to customer 290(*a*)) is distinct from the physical or logical organization of business data stored in a second customer database (e.g., customer database 870(*n*) corresponding to customer 290(*n*)).

Consequently, the analytics engine formulates a first customized database query (or a first customized set of one or more database queries) for execution on the first customer database, based on the set of data analytics parameters for the first customer, based on one or more properties (e.g., data type, physical data storage type, logical data storage type/schema) of the first customer database, or a combination thereof.

Similarly, the analytics engine formulates a second customized database query (or a second customized set of one or more database queries) for execution on the second customer database, based on the set of data analytics parameters for the second customer, based on one or more properties (e.g., data type, physical data storage type, logical data storage type/schema) of the second customer database, or a combination thereof. In some embodiments, the first customized database query (or the first customized set of one or more database queries) and the second customized database query (or the second customized set of one or more customized database queries), although mutually distinct, are generated by the same analytics engine to query two distinct customer databases.

In some embodiments, business intelligence system 225 includes an application layer 840 configured to (e.g., responsive to a request from a particular user affiliated with a particular customer), generate a customized business intelligence interface for transmission to the particular user.

Toward this end, the application layer 840 accesses a set of customization parameters (e.g., metadata) for the particular customer, from the metadata layer 860, to obtain a set of data display parameters for the particular customer. The application layer 840 obtains an analyzed dataset from the analytics engine 850, formats the analyzed dataset, for presentation on the customized business intelligence interface, based on the set of data display parameters; and formats, based on the set of data display parameters, one or more additional user interface elements (e.g., text, graphical content, or metadata) associated with the customized business intelligence interface.

Process for Generating Analytics Application

Figure 9:
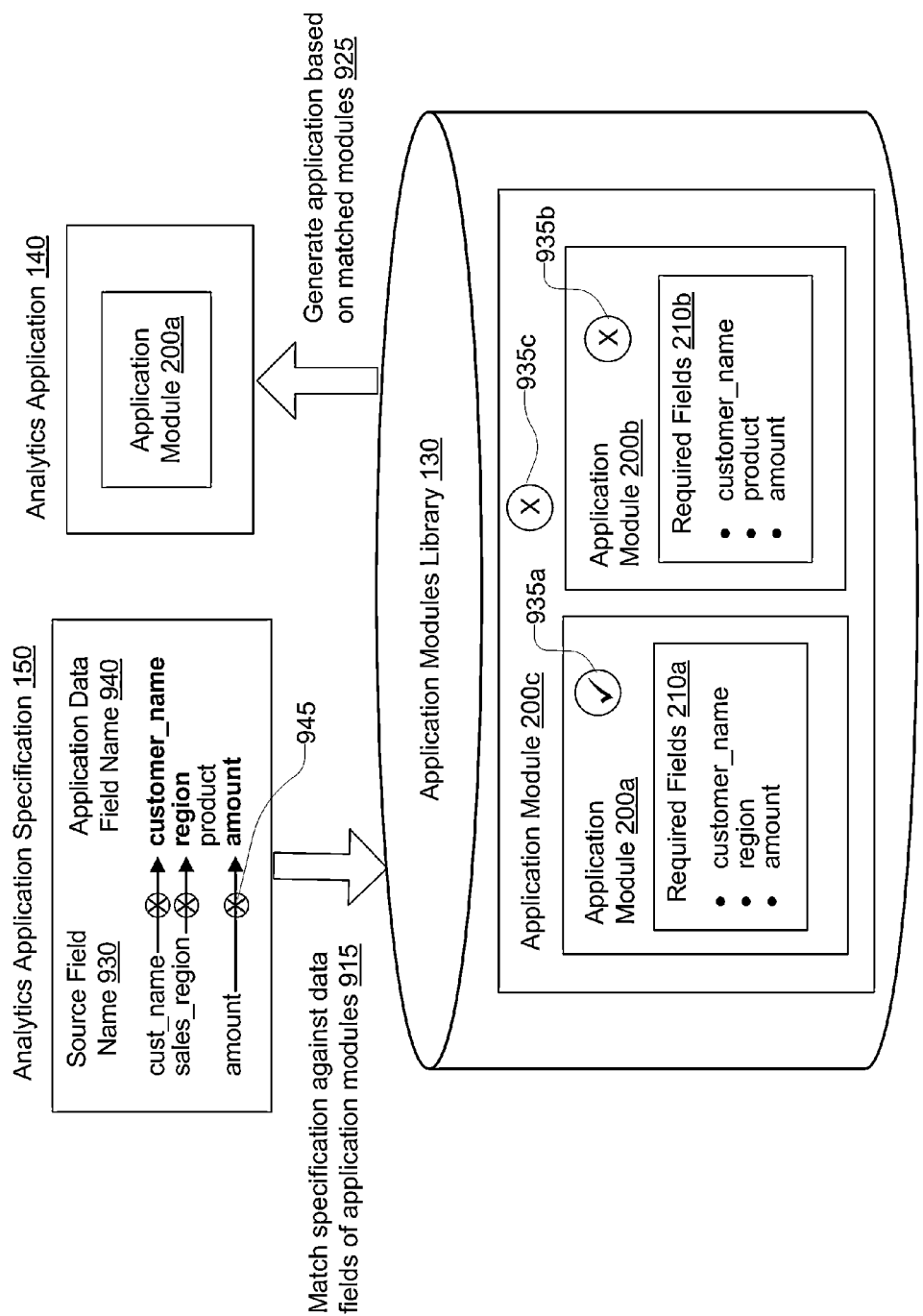
FIG. 9 illustrates the process of generation of an analytics application, in accordance with an embodiment.

FIG. 9 shows an example illustrating the process of generation of an analytics application, in accordance with an embodiment. The analytics application generator module 110 receives the specification 150 for an analytics application. The specification includes mapping of the names 940 of data fields used in the analytics application to names 930 of source fields corresponding to fields from a data source, for example, an external system. The analytics application generator module 110 matches 915 the analytics application specification 150 against the application modules. The analytics application generator module 110 matches 915 the data fields specified in the analytics application specification 150 with the data fields of the application modules. The analytics application generator module 110 selects a subset of application modules that match the analytics application specification 150 and generates the analytics application 140 using the selected application modules.

As shown in FIG. 9, the analytics application specification 150 specifies mapping for data fields customer_name, region, and amount to source fields of the data source. The data field customer_name of the application maps to the source field cust_name, the data field region of the application maps to the source field sales_region, and the data field amount of the application maps to the source field amount. There is no mapping specified for the data field product of the application.

As shown in FIG. 9, the application modules library stores a set of application modules including application modules 200*a*, 200*b*, and 200*c*. Application module 200*a* has required fields customer_name, region, and amount. Application module 200*b* has required fields customer_name, product, and amount. The application module 200*c* is a composite application module that includes application modules 200*a* and 200*b*.

The analytics application specification 150 includes all the data fields of application module 200*a*, i.e., customer_name, region, and amount. Therefore, the analytics application generator module 110 marks 935*a* the application module 200*a* as selected for generating 925 the analytics application. However, the analytics application specification 150 does not include all the data fields of application module 200*b* since it does not specify mapping of the data field product to any source field. Therefore, the analytics application generator module 110 marks 925*b* the application module 200*b* as rejected for purposes of generation of the analytics application 140. The application modules that are marked selected are included in the subset of application modules used for deployment of the analytics application whereas the application modules that are marked rejected are excluded from the subset of application modules used for deployment of the analytics application.

Figure 10:
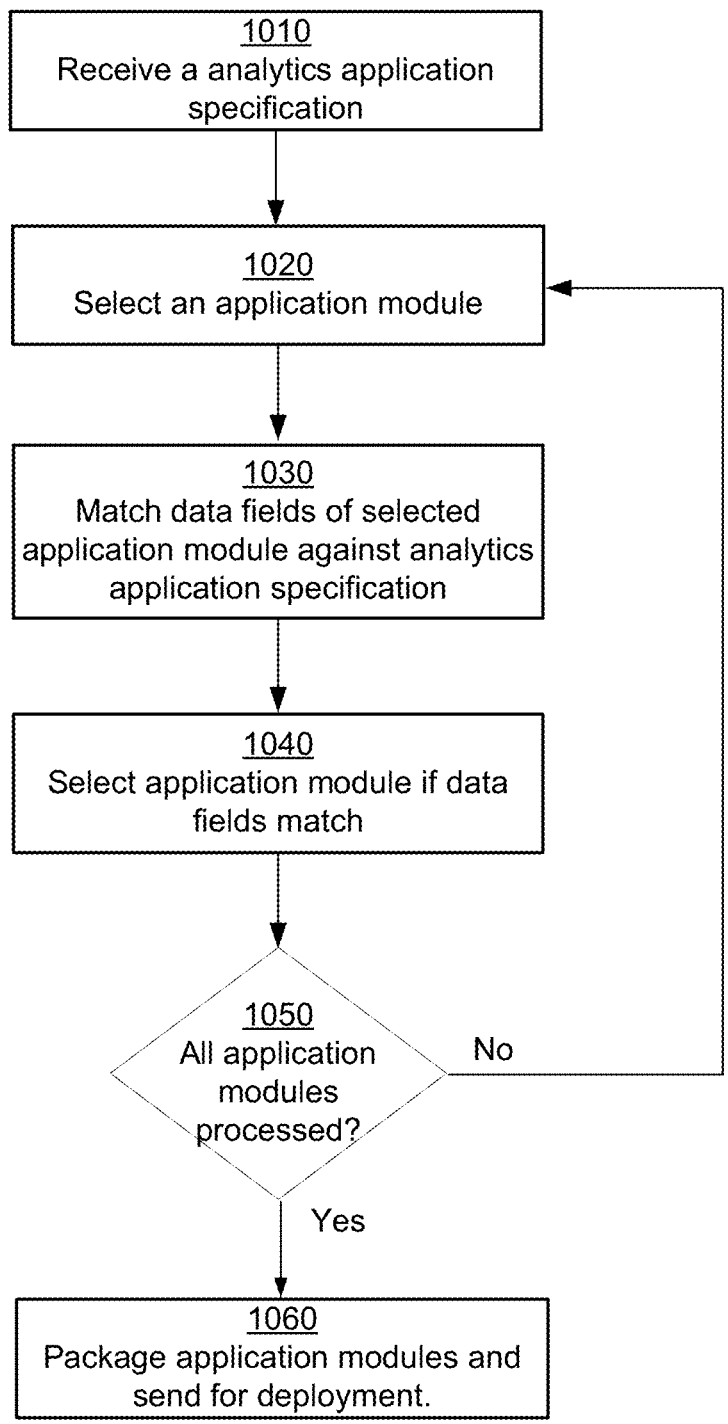
FIG. 10 shows a flowchart illustrating a process for generating analytics applications, according to an embodiment.

FIG. 10 shows a flowchart illustrating a process for generating analytics applications, according to an embodiment. The analytics application generator module 110 receives 1010 an analytics application specification 150 for processing. The application module matcher 710 matches the analytics application specification 150 against application modules stored in the application modules library 130.

The application module matcher 710 selects 1020 an application module for processing. The application module matcher 710 matches the data fields of the selected application module against the data fields specified in the analytics application specification 150. In particular, the application module matcher 710 checks if the analytics application specification 150 specifies a source field corresponding to each data field of the application module.

If the analytics application specification 150 specifies a source field for each data field of the application module, the application module is selected 1040 for purposes of generating the analytics application. If the analytics application specification 150 does not specify a source field for any data field of the application module, the application module is rejected for purposes of generating the analytics application. If an application module is rejected for purposes of generation of the analytics application, all composite application modules that include the rejected application modules are also rejected. The application module matcher 710 checks 1050 if all application modules are processed. If there are any remaining application modules to be matched, the application module matcher 710 repeats the steps 1020, 1030, 1040, and 1050 for each of the remaining application modules. If all application modules are processed, the application modules packaging module 730 packages the modules for deployment. The packaged modules are sent to the business intelligence system 225 for deployment of the analytics application.

Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating an analytics application, the method comprising:

storing, by a multi-tenant system, a set of application modules for use as reusable components of analytics applications, each application module comprising metadata, the multi-tenant system configured to receive and store data from a plurality of external systems and present analytics reports for each external system, the metadata describing:

a set of data fields processed by the application module, information for extracting data for the set of data fields of the application module from external systems, a database schema for storing data extracted from external systems, queries for generating data for an analytics report based on the data fields, and format for presentation of results of the analytics report;

for each of the plurality of external systems, generating an analytics application for the external system by the multi-tenant system, the generating comprising:

receiving an analytics application specification for the external system, the external system having a set of source fields, the analytics application specification including a mapping of source fields of the external system to data fields of the stored application modules;

for one or more stored application modules, determining whether the analytics application specification specifies a source field corresponding to each of the data fields of the application module;

selecting a plurality of application modules for including in the analytics application being generated, wherein the set of data fields of each of the plurality of application modules matches a distinct subset of the set of source fields of the external system;

packaging the plurality of selected application modules; and for each of the plurality of external systems, executing the generated analytics application by the multi-tenant system, the executing comprising:
  deploying the packaged plurality of selected application modules as the analytics application;
  periodically receiving data from the external system; and
  displaying reports generated using the received data via the deployed application.

2. The method of claim 1, further comprising:
  rejecting an application module if a data field of the application module fails to match any source field of the external system.

3. The method of claim 1, wherein the set of application modules comprises a composite module that includes a first application module and a second application module, such that selecting the composite module provides the queries of the first application module and the queries of the second application module in the generated analytics application.

4. The method of claim 3, wherein the composite application module further includes additional queries based on data fields from the first application module and the second application module.

5. The method of claim 4, wherein an additional query of the composite application module relates a first field from the first application module and a second field from the second application module wherein the first field and the second field are unrelated in the metadata of the first application module and the second application module.

6. The method of claim 3, further comprising:
  determining that the composite application module is excluded from the one or more application modules selected for the analytics application if at least one application module of the composite module includes a data field that fails to match to any source field of the external system.

7. The method of claim 1, further comprising:
  receiving request to customize an application module from the set of application module, the request specifying modification to the metadata of the application module;
  modifying the metadata of the application module based on the request to customize; and
  storing the modified application module.

8. The method of claim 1, wherein the packaged one or more selected application modules are sent to the server for deployment on a platform for executing analytics applications shared by multiple users.

9. The method of claim 1, wherein the information for extracting data for the set of data fields comprises parameters for creating a connection with the external system.

10. The method of claim 1, further comprising:
  receiving specification for transforming data retrieved from a source field of the external system to obtain data of a data field of the analytics application.

11. The method of claim 1, further comprising:
  sending, to a client device, information identifying fields from the set of source fields of the external system that are not included in the one or more application modules selected for generating the analytics application.

12. A non-transitory computer-readable storage medium storing instructions for:
  storing, by a multi-tenant system, a set of application modules for use as reusable components of analytics applications, each application module comprising metadata, the multi-tenant system configured to receive and store data from a plurality of external systems and present analytics reports for each external system, the metadata describing:
    a set of data fields processed by the application module,
    information for extracting data for the set of data fields of the application module from external systems,
    a database schema for storing data extracted from external systems,
    queries for generating data for an analytics report based on the data fields, and
    format for presentation of results of the analytics report;
  for each of the plurality of external systems, generating an analytics application for the external system by the multi-tenant system, the generating comprising:
    receiving an analytics application specification for the external system, the external system having a set of source fields, the analytics application specification including a mapping of source fields of the external system to data fields of the stored application modules;
    for one or more stored application modules, determining whether the analytics application specification specifies a source field corresponding to each of the data fields of the application module;
    selecting a plurality of application modules for including in the analytics application being generated, wherein the set of data fields of each of the plurality of application modules matches a plurality of a distinct subset of the set of source fields of the external system; and
    packaging the plurality of selected application modules; and
  for each of the plurality of external systems, executing the generated analytics application by the multi-tenant system, the executing comprising:
    deploying the packaged plurality of selected application modules as the analytics application;
    periodically receiving data from the external system; and
    displaying reports generated using the received data via the deployed application.

13. The non-transitory computer readable storage medium of claim 12, wherein the set of application modules comprises a composite module that includes a first application module and a second application module, such that selecting the composite module provides the queries of the first application module and the queries of the second application module in the generated analytics application, the composite application module further comprising additional queries based on the fields from the first application module and the second application module.

14. The non-transitory computer readable storage medium of claim 13, wherein an additional query of the composite application module relates a first field from the first application module and a second field from the second application module wherein the first field and the second field are unrelated in the metadata of the first application module and the second application module.

15. The non-transitory computer readable storage medium of claim 13, further comprising instructions for:
  determining that the composite application module is excluded from the one or more application modules selected for the analytics application if at least one application module of the composite application module includes a data field that fails to match to any source field of the external system.

16. The non-transitory computer readable storage medium of claim 12, further comprising instructions for:
rejecting an application module if a data field of the application module fails to match any source field of the external system.

17. The non-transitory computer readable storage medium of claim 12, further comprising instructions for:
receiving request to customize an application module from the set of application module, the request specifying modification to the metadata of the application module;
modifying the metadata of the application module based on the request to customize; and
storing the modified application module.

18. The non-transitory computer readable storage medium of claim 12, wherein the information for extracting data for the set of data fields comprises parameters for creating a connection with the external system.

19. The non-transitory computer readable storage medium of claim 12, further comprising instructions for:
receiving specification for transforming data retrieved from a source field of the external system to obtain data of a data field of the analytics application.

20. A computer system, comprising:
a computer processor; and
non-transitory computer-readable storage medium storing instructions for:
storing, by a multi-tenant system, a set of application modules for use as reusable components of analytics applications, each application module comprising metadata, the multi-tenant system configured to receive and store data from a plurality of external systems and present analytics reports for each external system, the metadata describing:
a set of data fields processed by the application module,
information for extracting data for the set of data fields of the application module from external systems,
a database schema for storing data extracted from external systems,
queries for generating data for an analytics report based on the data fields, and
format for presentation of results of the analytics report;
for each of the plurality of external systems, generating an analytics application for the external system by the multi-tenant system, the generating comprising:
receiving an analytics application specification for the external system, the external system having a set of source fields, the analytics application specification including a mapping of source fields of the external system to data fields of the stored application modules;
for one or more stored application modules, determining whether the analytics application specification specifies a source field corresponding to each of the data fields of the application module;
selecting a plurality of application modules for including in the analytics application being generated, wherein the set of data fields of each of the plurality of application modules matches a distinct subset of the set of source fields of the external system;
packaging the plurality of selected application modules; and
for each of the plurality of external systems, executing the generated analytics application by the multi-tenant system, the executing comprising:
deploying the packaged plurality of selected application modules as the analytics application;
periodically receiving data from the external system; and
displaying reports generated using the received data via the deployed application.

\* \* \* \* \*